United States Patent [19]

Van Heyningen

[11] 4,189,806

[45] Feb. 26, 1980

[54] REMOVING BACK FAT FROM LOIN

[75] Inventor: Woeldrik P. Van Heyningen, Edmonton, Canada

[73] Assignee: Swift Canadian Co., Limited, Etobicoke, Canada

[21] Appl. No.: 876,343

[22] Filed: Feb. 9, 1978

[30] Foreign Application Priority Data

Feb. 15, 1977 [CA] Canada .................................. 271794

[51] Int. Cl.² .......................... A22B 5/16; A22C 17/12
[52] U.S. Cl. ........................................ 17/52; 17/1 R; 17/50
[58] Field of Search .................... 17/21, 50, 1 R, 1 G, 17/52

[56] References Cited

U.S. PATENT DOCUMENTS

| | | | |
|---|---|---|---|
| 3,546,737 | 12/1970 | Neebel et al. | 17/1 R |
| 3,982,299 | 9/1976 | Kompan | 17/1 R |
| 4,009,652 | 3/1977 | Anderson | 17/1 R X |

FOREIGN PATENT DOCUMENTS 693728  9/1964  Canada ................................... 17/1 R

*Primary Examiner*—Willie G. Abercrombie
*Attorney, Agent, or Firm*—Charles E. Bouton

[57] ABSTRACT

Fat is trimmed from loin portions which have been previously separated from carcasses by placing the portions fat side downwardly upon a symmetrically arcuate conveying surface which carries the portion beneath an overhead gripping means which tends to compress the loin portion against the conveying surface as it is forced past a symmetrically arcuate knife blade. The knife blade is adjustable with respect to the distance from the conveying surface.

8 Claims, 5 Drawing Figures

REMOVING BACK FAT FROM LOIN

The present invention relates to the food processing art and more specifically is an improved method and apparatus for trimming the back fat from loins. The invention relates principally to the processing of pork but may also have application to the processing of other meat species.

Meat packers slaughter animals and process the carcasses. Part of the processing includes subdividing the carcasses into various parts. Usually each carcass is divided into two halves. Each carcass half contains a loin which is a desirable portion of lean meat adjacent the back bone and between the ribs and outer layer of fat. Often it is desired to separate the loin portions from each carcass half. To accomplish this the ribs are scribed or cut a distance from the back bone to permit entry of a knife whereby the loin may be cut away from the remainder of the carcass. To this day, most loins are separated by hand manipulation of a knife. However, there have been a number of machines developed to perform this function automatically. Usually separation of the loin has been accomplished by drawing a contoured knife lengthwise of the carcass between the lean and fat portions so as to preserve intact a maximum amount of lean meat. The contoured knives have generally been of a nonsymmetrical shape; and different knifes of essentially opposite configuration have been required for separating the loins from the opposite carcass halves.

The machines that have heretofore been developed to mechanically perform this function are believed to have been adapted to handle entire carcass halves and have utilized contoured nonsymmetrical blades. Accordingly, it is also believed that such machines have to be duplicated in opposite configurations to handle the opposite carcass halves.

Accordingly, it would be of great advantage to provide a technique and improved apparatus which can trim loin portions obtained from both carcass halves.

It is therefore a principal object of the present invention to provide an improved method and apparatus for trimming the back fat from loin portions.

It is a further object of the present invention to provide an improved method and apparatus for trimming the back fat from loins of varying sizes and taken from either carcass half of an animal.

It is still another object of the present invention to provide an improved method and apparatus for automatically passing a loin portion across a trimming knife in a posture whereby a symmetrical cut may be made to separate excess fat from the lean meat.

In general, the present invention requires that the loin portions be first separated from the carcass halves or sides by cutting straight through the scribed ribs and tissues. This leaves a loin portion with the entire excess fat covering remaining thereon. That portion is placed centrally and in an evenly balanced manner on an arcuate conveyor which is propelled to carry the loin portion across a knife blade that is adjustably positioned with respect to the carrying surface. Just prior to the loin portion reaching the knife blade it is positively gripped along its upper surface and thereby propelled at equal speed with the conveyor surface and simultaneously compressed so as to be held under compression against the conveying surface as the cut is made.

Further objects and advantages of the present invention will become apparent from a reading of the following detailed disclosure in conjunction with the drawings wherein.

Figure 1:
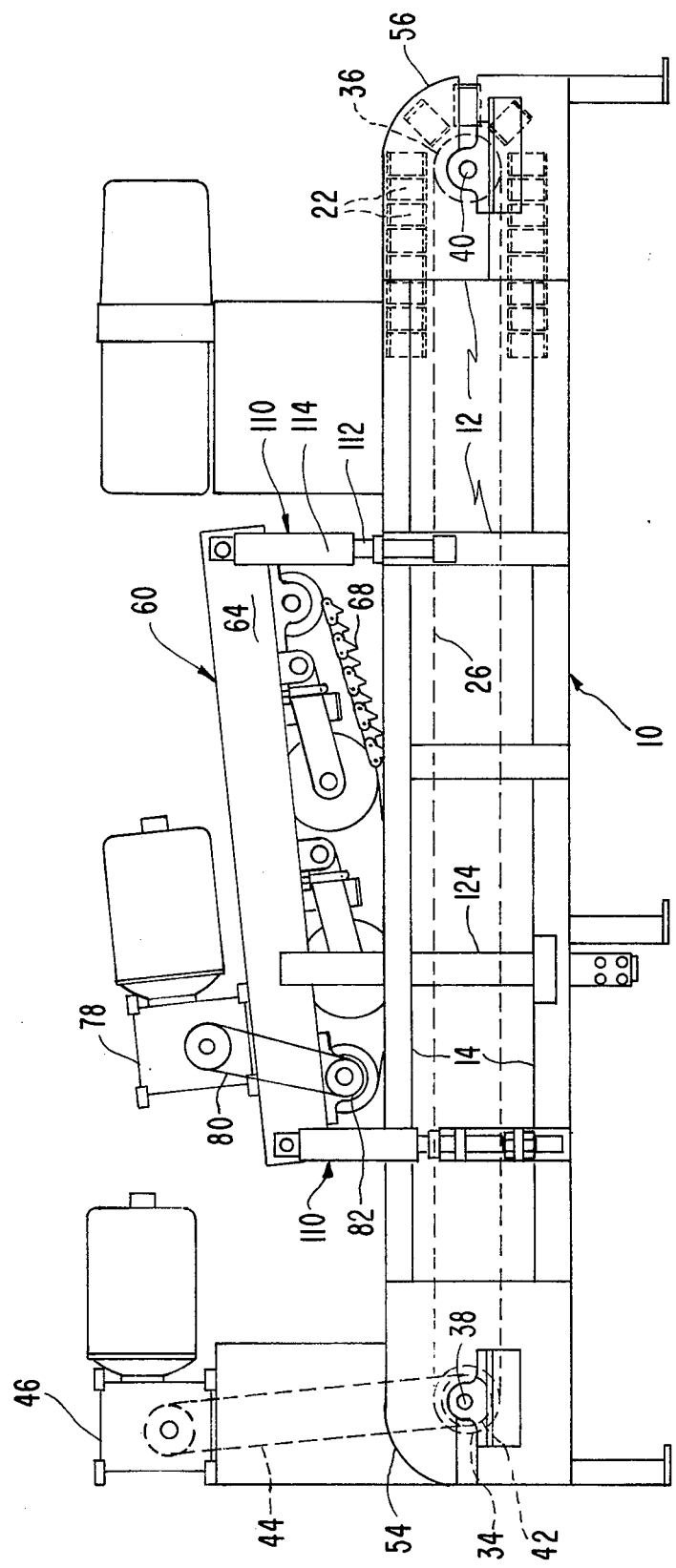
FIG. 1 is a side elevation view of a preferred apparatus embodiment of the present invention.

In performing the present invention the ribs of each carcass half are scribed and cut fully through the carcass directly to the outer edge of the back fat so as to leave a loin portion, free of the outer rib end, with full carcass fat thereon. These portions from both halves of the carcass are placed successively, fat side downwardly, on an evenly and symmetrically curved conveying surface which is of a size to accommodate the general range of loin portions. Each loin is laid on the conveying surface so that the general curve of back fat is distributed evenly, and substantially symmetrically, to either side of the longitudinal center line of the conveying surface.

The loin portions are conveyed at a given constant speed and in a given direction toward a relatively fixed symmetrically arcuate knife blade. Preferably, the back fat is positively engaged by small penetrating members on the conveying surface. Also preferably, the knife blade is substantially congruent to the conveying surface; and is adjustable toward and away from the conveying surface whereby the thickness of fat to be trimmed may be regulated.

Each loin portion is also positively gripped and propelled forward along the upper surface thereof as it approaches the point at which the fat is severed from the lean by the knife blade. Preferably, the loin portion is progressively compressed as it is thus gripped and the compression reaches a maximum amount directly at the point at which the fat is severed. After passing beyond the knife blade the lean loin and separated back fat are individually further processed.

As may be seen in the drawings, the preferred form of an apparatus comprises a frame generally 10 formed of a plurality of upright members 12 and horizontal angle members 14 joined by horizontal cross pieces 16.

An arcuate conveyor surface generally 20 is supported on the frame 10. The conveyor surface is comprised of a plurality of arcuate slats 22 which are in the form of a symmetrical arc with outstanding wings 24 at each side. The slats 22 are fastened at their centers to an endless chain 26 with the edges of adjacent slats 22 closely spaced. The slats 22 are secured to the endless chain 26 structure by a plurality of pins 28 (two pins for each slat). The endless chain 26 is secured to the undersurface (convex surface) of the arcuate slats 22 and the pins 28 extend above the upper-concave surface of the slats 22 as short penetrating points 30.

The endless chain 26 is trained about sprockets 34, 36 (to the left and right, respectively, in FIG. 1) which in turn are mounted to axles 38 and 40, respectively. At one outer end of axle 38 a drive sprocket 42 is secured and in turn is connected by a drive chain 44 to an electric motor-gear reducer unit 46.

The upper and lower runs of the endless conveyor surface formed by the arcuate slats 22 are supported on pairs of horizontal rails 50 and 52, respectively. The wing portions 24 of the slats 22 slide on the upper surfaces of the horizontal rails 50 which are mounted within the horizontal angle members 14. Pairs of curved guides 54, 56 at either end of the frame generally 10 define the path for the slats 22 at the ends of the apparatus.

An overhead gripping means generally 60 is positioned above the frame generally 10 at approximately the central portion thereof. The gripping means 60 comprises a carriage member 64 under which a pair of endless chains 66, 68 are supported on pairs of sprockets 70, 72 which are mounted on shafts 74, 76 that are in turn rotatably supported in pillow bearings beneath the carriage member 64. The carriage 64 is normally tilted toward the downstream end of the frame generally 10, and at the lower end thereof is mounted an electric motor-gear reducer unit 78 which is drivingly connected by a drive chain 80 to a sprocket 82 which is secured to the outer end of shaft 74.

Each of the endless chains 66, 68 carries an endless succession of teeth 86 which are substantially triangular in shape and oriented for maximum propulsion effect toward the downstream end of the apparatus. The lower runs of endless chains 66, 68 are urged downwardly toward the arcuate conveyor surface generally 20 by pairs of first and second idler wheels 90, 92. Idler wheels 90, 92 are in turn swingably supported on first and second pairs of arms 94, 96 which are secured by hinge pins 98, 100, respectively, to the underside of the carriage 64. Pairs of first and second springs 102, 104 are mounted between the carriage 64 and the various arms 94, 96 so as to urge the idler wheels 90, 92 downwardly. Maximum downward movement is limited, however, by first and second retainer members 106, 108.

The overhead gripping means generally 60 is also supported by cushion mounting means generally 110 which permit it to be biased downwardly toward the arcuate conveyor surface generally 20. The cushion mounting means generally 110 are shock absorbers comprising four piston rods 112 and cylinders 114 secured between the frame generally 10 and carriage generally 64 at each corner of the latter. The piston rods 112 attach to pistons (not shown) within each cylinder 114. The pistons are spring biased into the cylinders to form spring loaded shock absorbers whereby the overhead gripping means 60 is urged by both gravity and the cushioning means 110 toward the conveyor surface. Small ports in each piston (not shown) permit air to move between the ends of each cylinder and dampen vertical movement. At the downstream end the cushioning means 110 are secured to the frame 10 to normally position the carriage 64 and endless chains 66, 68 relatively close to the slats 22. At the opposite upstream end the cushioning means 110 are secured to the frame 10 so as to keep that end of the carriage 64 slightly elevated. Preferably the piston rods 112 at the upstream end are adjustable for this purpose. Thus, when a loin carried on the slats 22 runs beneath the overhead gripping means generally 60, the carriage 64 will be urged upwardly against the forces of the springs within the cylinders 114. The loin is thus compressed between the slats 22 and endless chains 66, 68 with maximum compression being greater at the downstream end beneath the weight of the electric motor 78.

At approximately the latter position an arcuate knife blade 120 is located closely adjacent the upper (concave) surface of the slats 22. The knife blade 120 is movable vertically on a yoke which is comprised of two vertical members 122, 124 which are slidable in guides 126 fastened to opposite uprights 12 on the frame generally 10. The lower ends of the vertical members 122, 124 are joined together by a tie member 128 which is in turn secured to the free end of a piston rod 130 extending from a hydraulic cylinder 132. The latter is fastened to a bracket 134 extending between a pair of uprights 12. The hydraulic cylinder 132 is also operatively connected to be driven by a hydraulic motor and pump (not shown).

Figure 2:
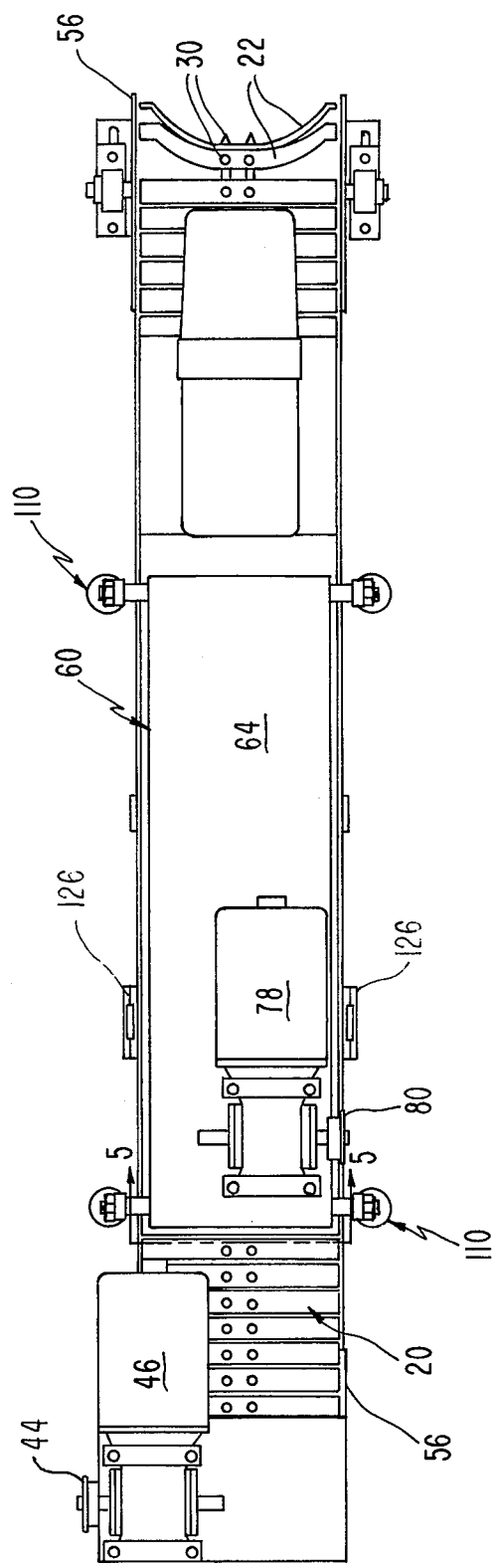
FIG. 2 is a plan view of the apparatus shown in FIG. 1.
Figure 3:
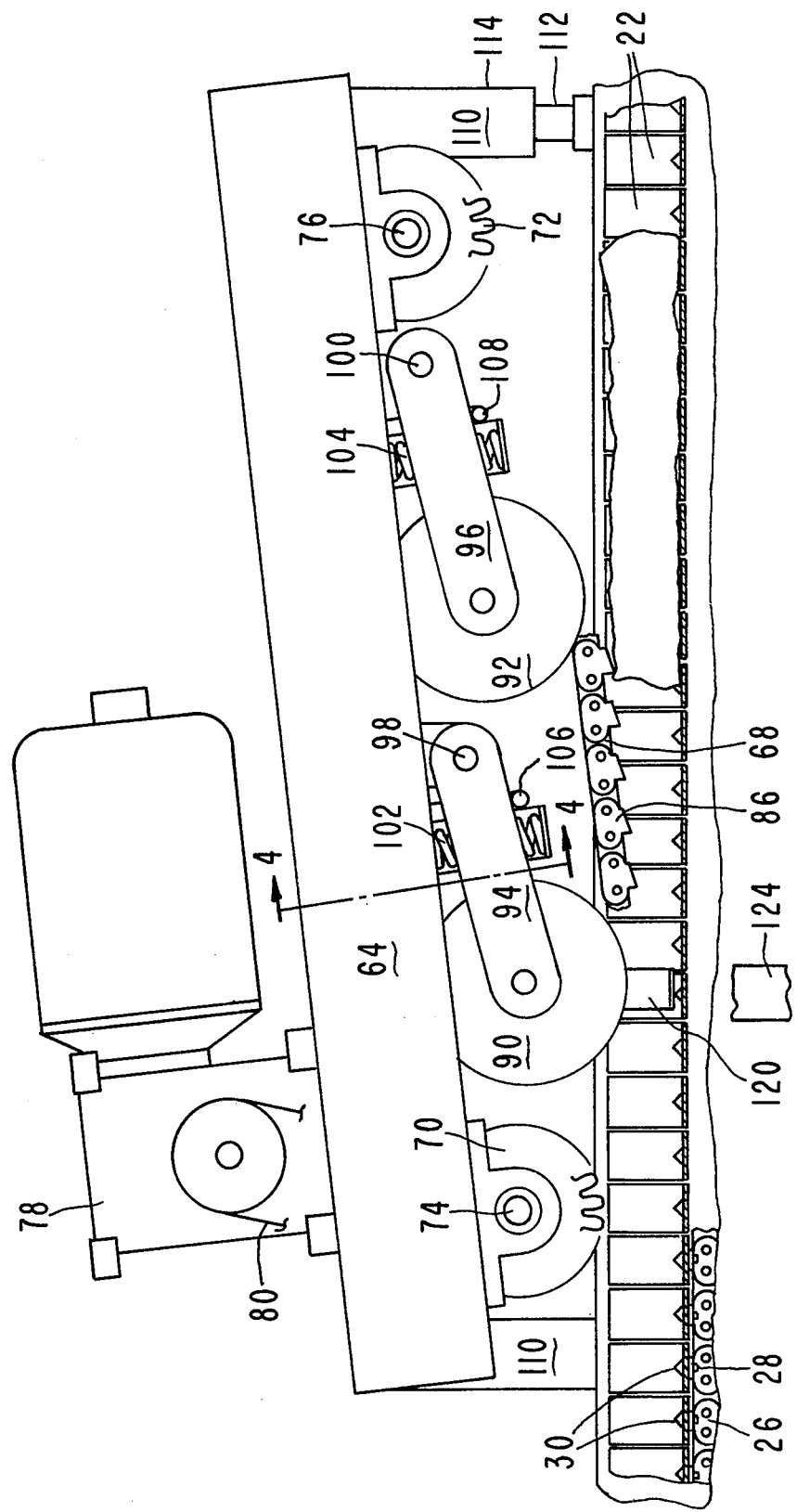
FIG. 3 is a side elevation view in greater detail of a portion of the apparatus shown in FIG. 1, with parts removed for clarity.
Figure 4:
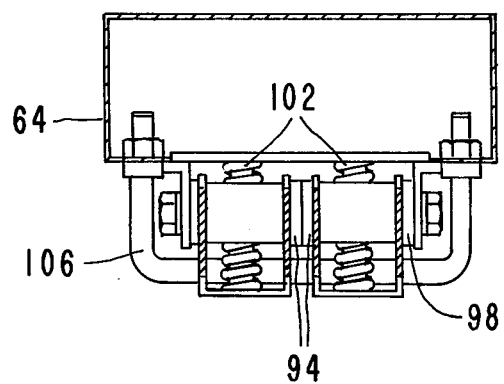
FIG. 4 is a section view of said portion of the apparatus taken at line 4—4 in FIG. 3.
Figure 5:
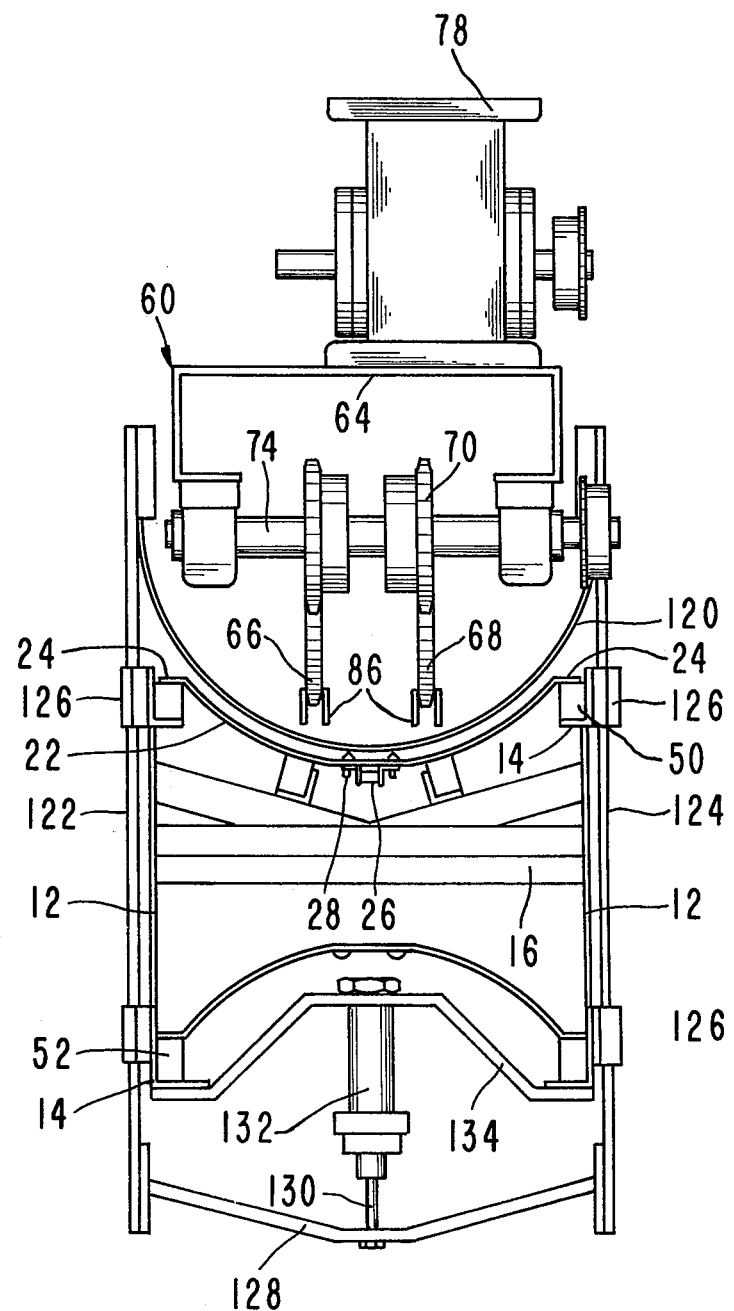
FIG. 5 is an end elevation view, in partial section, taken at line 5—5 in FIG. 2.

The operation of the apparatus requires that all of the aforementioned endless chains 26, 66 and 68 be driven at substantially the same lineal speed and with the upper run of chain 26 and the lower runs of chains 66 and 68 driven in the same direction, namely toward the downstream end of the apparatus (to the left in FIGS. 1, 2 and 3). Loin portions are placed centrally of the arcuate slats 22 at the upstream end of the apparatus, and the back fat is pressed downwardly upon the penetrating points 30. The apparatus will thus advance the pork loins toward the knife blade 120 which has a single sharpened edge pointing upstream. The knife blade 120 is adjusted by the operator through the control of fluid, in a well understood manner, to the cylinder 132. The operator judges the thickness of fat to be trimmed from each loin and positions the knife blade 120 a distance equal to the required trim thickness above the arcuate slats 122. Some compensation must be made for the compressive effect of the overhead gripping means generally 60.

As the pork loins move downstream on the conveyor surface generally 20 they will move under the upper end of the gripping means generally 60. Since the latter is mounted on a cushion means it will automatically move upwardly, where necessary, to accommodate the vertical dimension of a loin moving thereunder. However, the weight of the electric motor and gear reducer assembly 78 at the downstream end of the carriage 64 will cause a gradually increasing compressing force to be applied to the pork loin as it is advanced beneath the endless chains 66, 68. The teeth 86 and the penetrating points 30 force the loin across the knife blade 120 which smoothly separates the fat and lean portions.

It will also be understood that the foregoing apparatus may be further modified to include a photoelectric sensing system, or the like, to automatically adjust the vertical position of the knife blade 120 in accordance with the lean and fat layers that may be observed and measured on the forward advancing end of each pork loin.

Obviously many modifications and variations of the invention as hereinbefore set forth may be made without departing from the spirit and scope thereof, and, therefore, only such limitations should be imposed as are indicated in the appended claims.

I claim:

1. An improved method for removing back fat from loins, said method comprising: first separating loin portions with excess fat from both carcass halves; placing each said loin portion centrally and in an evenly balanced manner on an arcuate conveying surface with the fat side against said surface; engaging the fat with penetrating members centrally of said surface; moving each loin portion in a given direction at a given speed toward a relatively fixed symmetrically arcuate knife blade, said blade being positioned in the path of said loin portion and adjustable toward and away from said conveying surface so as to separate a fat layer of a desired constant thickness from said loin portion; and positively gripping the upper surface of said loin portion along two courses prior to reaching said knife blade and propelling same in said given direction and at said given speed; and continuing to grip and propel said upper surface of said loin portion across said knife blade to a point in said direction therebeyond.

2. The method of claim 1 wherein a downward force is applied against said upper surface with said force increasing to a maximum at about the location of said knife blade.

3. An improved apparatus for removing back fat from loins, said apparatus comprising: a frame; a symmetrically arcuate conveyor surface supported for movement along a path on said frame at a given speed in a given direction; penetrating members secured to said conveyor surface to engage the fat of a loin portion placed on said surface; gripping means located above said path and said conveyor surface, said gripping means including a pair of endless overhead chains each bearing an endless succession of teeth which penetrate said loin portion, said endless overhead chains being drivable in said given direction and at said given speed whereby to propel loin portions in said direction, and said gripping means being movable toward and away from said conveyor surface and tending to exert a compressive force against loin portions carried on said conveyor surface; and a symmetrically arcuate knife blade positioned between said conveyor surface and said gripping means, said blade being adjustably mounted for positioning at a distance from said conveyor surface said distance corresponding to the trim thickness required for one or more loins.

4. An improved apparatus according to claim 3 wherein said conveyor surface is comprised of a plurality of arcuate slats secured to an endless chain and trained to slide on horizontal rails mounted on said frame.

5. An improved apparatus according to claim 4 wherein said penetrating members also secure said slats to said endless chain.

6. An improved apparatus according to claim 3 wherein said endless overhead chains are mounted under a carriage, said carriage being mounted on cushioning means which permit vertical movement and said carriage being biased downwardly toward said conveying surface by gravity; and spring biasing means including idler wheels further urging the lower runs of said endless overhead chains toward said conveyor surface.

7. An improved apparatus according to claim 6 wherein said cushioning means comprise four cylinders and spring biased pistons wherein the pistons contain ports to permit restricted flow of air to either end of said cylinder.

8. An improved apparatus according to claim 3 wherein the knife blade is symmetrically arcuate and congruent to said conveyor surface.

* * * * *